(12) United States Patent
Backlund et al.

(10) Patent No.: US 8,718,610 B2
(45) Date of Patent: May 6, 2014

(54) CONTROLLING SOUND CHARACTERISTICS OF ALERT TUNES THAT SIGNAL RECEIPT OF MESSAGES RESPONSIVE TO CONTENT OF THE MESSAGES

(75) Inventors: Erik Johan Vendel Backlund, Gantofta (SE); Andreas Kristensson, Malmö (SE); Pär-Anders Aronsson, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 934 days.

(21) Appl. No.: 12/327,198

(22) Filed: Dec. 3, 2008

(65) Prior Publication Data

US 2010/0136950 A1 Jun. 3, 2010

(51) Int. Cl.
*H04M 1/663* (2006.01)

(52) U.S. Cl.
USPC ............... 455/412.2; 455/412.1; 455/401; 379/82; 379/100.06; 379/88.12; 382/118; 382/119; 382/313; 382/292; 704/260

(58) Field of Classification Search
USPC ........ 455/412.1, 550.1, 412.2, 221, 567, 466; 382/118, 325, 305, 278, 291, 307; 379/82, 100.06, 88.12; 704/206
See application file for complete search history.

(56) References Cited

U.S. PATENT DOCUMENTS

| 5,705,995 | A | 1/1998 | Laflin et al. |
| 6,314,306 | B1 | 11/2001 | Harris |
| 7,142,664 | B2* | 11/2006 | Seligmann ............ 379/373.01 |
| 7,356,470 | B2* | 4/2008 | Roth et al. .................... 704/270 |
| 7,983,701 | B2* | 7/2011 | Bell et al. ..................... 455/466 |
| 2003/0072474 | A1* | 4/2003 | Kies ............................ 382/118 |

(Continued)

FOREIGN PATENT DOCUMENTS

| CN | 1722750 A | 1/2006 |
| CN | 1 983 252 A | 6/2007 |
| EP | 1 170 930 A1 | 1/2002 |
| EP | 1 613 050 A1 | 1/2006 |

OTHER PUBLICATIONS

International Preliminary Report on Patentability corresponding to International application No. PCT/IB2009/052368; Date of mailing: Feb. 22, 2011; 11 pages.

(Continued)

*Primary Examiner* — Khalid Shaheed
(74) *Attorney, Agent, or Firm* — Myers Bigel Sibley & Sajovec, P.A.

(57) ABSTRACT

A communication terminal includes a transceiver and a controller. The transceiver receives electronic messages from another communication terminal. The controller responds to receipt of each of the messages by examining content of the message according to at least one defined rule and to control sound characteristics of an alert tune that is played through a speaker responsive to the examined message content. The controller may attempt to match text from the message to a stored list of words and/or phrases, and to control the sound characteristics of the alert tune in response to an outcome of the matching.

13 Claims, 6 Drawing Sheets

(56) References Cited

U.S. PATENT DOCUMENTS

| | | | |
|---|---|---|---|
| 2003/0074196 A1* | 4/2003 | Kamanaka | 704/260 |
| 2006/0003813 A1 | 1/2006 | Seligmann et al. | |
| 2006/0003814 A1* | 1/2006 | Moody et al. | 455/567 |
| 2008/0268911 A1* | 10/2008 | Eronen et al. | 455/567 |
| 2009/0029683 A1 | 1/2009 | Moody et al. | |
| 2009/0042543 A1 | 2/2009 | Nagata et al. | |

OTHER PUBLICATIONS

Notification of Transmittal, International Search Report, Written Opinion of the International Searching Authority, PCT Application No. PCT/IB2009/052368, Sep. 15, 2009.

First Notification of Office Action and English language translation, CN Application No. 200980148245.6, Mar. 28, 2013.

* cited by examiner

CONTROLLING SOUND CHARACTERISTICS OF ALERT TUNES THAT SIGNAL RECEIPT OF MESSAGES RESPONSIVE TO CONTENT OF THE MESSAGES

BACKGROUND OF THE INVENTION

The present invention relates to wireless communication terminals, and, more particularly, to alerting users in response to receiving messages.

Wireless communication terminals are continuing to evolve to provide increasing functionality. Many communication terminals can now not only make and receive voice calls, they can further send and receive text messages, picture messages, and video messages. With the proliferation of different forms of communication that are provided by communication terminals, there is a continuing need to provide improved ways of alerting users when calls and messages are received.

SUMMARY OF THE INVENTION

According to some embodiments of the present invention, a communication terminal includes a transceiver and a controller. The transceiver receives electronic messages from another communication terminal. The controller responds to receipt of each of the messages by examining content of the message according to at least one defined rule and by controlling sound characteristics of an alert tune that is played through a speaker responsive to the examined message content.

In some further embodiments, the controller may attempt to match text from the message to a stored list of words and/or phrases, and to control the sound characteristics of the alert tune in response to an outcome of the matching.

The controller may select among a plurality of alert tunes stored in the communication terminal and having different sound characteristics in response to successfully matching text from the message to one or more stored words and/or phrases that are associated with different ones of the alert tunes, and may then play the selected alert tune.

The controller may regulate pitch of the played alert tune in response to matching text from the message to one or more of the stored words and/or phrases.

The controller may carry out one of increasing and decreasing pitch of the played alert tune in response to matching text from the message to one or more of the stored words and/or phrases that are known to indicate that a positive emotion is being conveyed in the message text, and may carry out the other one of increasing and decreasing the pitch of the played alert tune in response to matching text from the message to one or more of the stored words and/or phrases that are known to indicative that a negative emotion is being conveyed in the message text.

The controller may increase pitch of the played alert tune in response to matching text from the message to one or more of the stored words and/or phrases that are known to indicate that an urgent situation is being conveyed in the message text.

The controller may regulate pitch of the played alert tune in response to how many words of the text from the message are determined to match the stored words and/or phrases.

The controller may regulate volume of the played alert tune in response to matching text from the message to one or more of the stored words and/or phases.

The controller may increase volume of the played alert tune in response to matching text from the message to one or more of the stored words and/or phrases that are known to indicate that a positive emotion is being conveyed in the message text, and may decrease volume of the played alert tune in response to matching text from the message to one or more of the stored words and/or phrases that are known to indicate that a negative emotion is being conveyed in the message text.

The controller may increase volume of the played alert tune in response to matching text from the message to one or more of the stored words and/or phrases that are known to indicate that an urgent situation is being conveyed in the message text.

The controller may regulate volume of the played alert tune in response to how many words of the text from the message are determined to match the stored words and/or phrases.

When a song is continuing to be played from the communication terminal when a message arrives, the controller may change sound characteristics of the song in response to matching text from the message to one or more of the stored words and/or phrases.

When a song is continuing to be played from the communication terminal when a message arrives, the controller may repetitively increase and decrease pitch and/or volume of the song being played to create an audible alert while playing the song in response to matching text from the message to one or more of the stored words and/or phrases.

When a song is continuing to be played from the communication terminal when a message arrives, the controller may increase a rate at which the pitch and/or the volume of the played song is repetitively increased and decreased in response to matching text from the message to one or more of the stored words and/or phrases that are known to indicate that a positive emotion is being conveyed in the message text, and may decrease a rate at which the pitch and/or the volume of the played song is repetitively increased and decreased in response to matching text from the message to one or more of the stored words and/or phrases that are known to indicate that a negative emotion is being conveyed in the message text.

When a song is continuing to be played from the communication terminal when a message arrives, the controller may increase a rate at which the pitch and/or the volume of the played song is repetitively increased and decreased in response to matching text from the message to one or more of the stored words and/or phrases that are known to indicate that an urgent situation is being conveyed in the message text.

The controller may play the alert tune in response to matching text from the message to a stored list of words and/or phrases, and may not play (inhibit playing of) the alert tune in response to not matching the text from the message to the stored list of words and/or phases.

The controller may assemble a song from a sequence of alert tune segments that are selected in response a sequence of message words and/or phrases that are matched to different entries in a stored list of words and/or phrases. The order by which the controller plays the alert tune segments to form the song may correspond to the order of occurrence of the matched words and/or phrases in the message text.

The controller may regulate pitch and/or volume of the played alert tune in response to whether the message contains picture data and/or video data.

The controller may analyze an image contained within picture data and/or video data of the message to determine whether the image contains an object that matches characteristics that have been previously defined in the communication terminal, and may regulate pitch and/or volume of the played alert tune in response to an outcome of the image analysis.

In some other embodiments, the communication terminal includes a transceiver and a controller. The transceiver that is configured to receive electronic messages from another communication terminal. The controller is configured to respond to receipt of each of the messages by examining content of the message to attempt to match message text to a stored list of words and/or phrases, and to play through a speaker an alert tune have sound characteristics that are controlled in response to an outcome of the matching. The controller increases pitch and/or volume of the played alert tune in response to matching the message text one or more of the stored words and/or phrases that are known to indicate that a positive emotion is being conveyed in the message text, and to decrease pitch and/or volume of the played alert tune in response to matching the message text to one or more of the stored words and/or phrases that are known to indicative that a negative emotion is being conveyed in the message text.

In some other embodiments, a method of operating a communication terminal includes receiving electronic messages from another communication terminal. In response to receiving each of the messages, an image contained within picture data and/or video data content of the message is analyzed to determine whether the image contains an object that matches characteristics that have been previously defined in the communication terminal. An alert tune have sound characteristics that are controlled in response to an outcome of the image analysis is played through a speaker.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Figure 1:
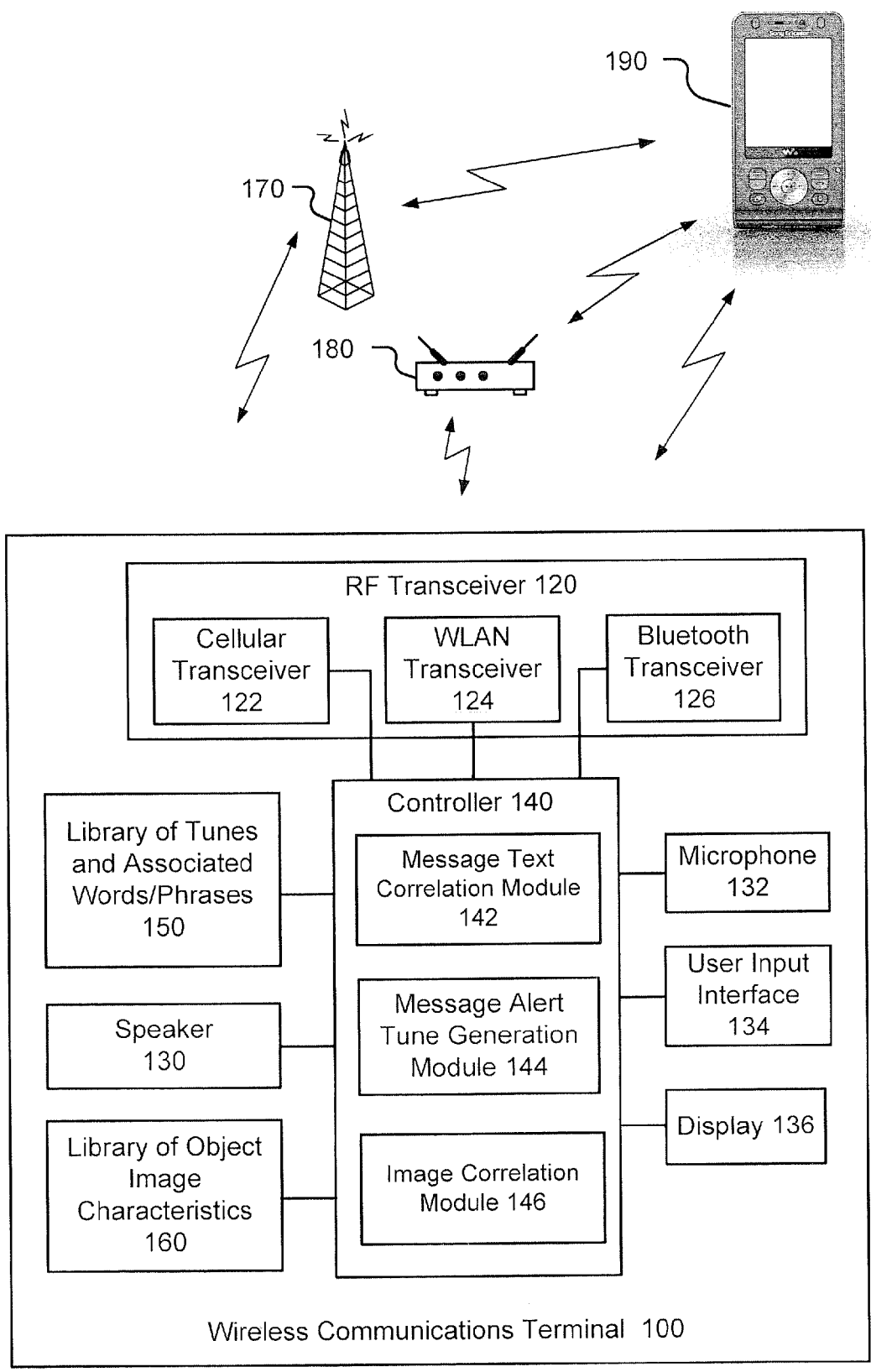
FIG. 1 is a block diagram that illustrates a wireless communication terminal that generates a message alert tune in accordance with some embodiments of the present invention.

The present invention now will be described more fully hereinafter with reference to the accompanying figures, in which embodiments are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" (and variants thereof) when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element/step (and variants thereof), it can be directly responsive to the other element/step, or intervening elements/steps may be present. In contrast, when an element/step is referred to as being "directly responsive" to another element/step (and variants thereof), there are no intervening elements/steps present. As used herein the term "and/or" includes any and all combinations of one or more of the associated listed items and may be abbreviated as "/".

It will be understood that, although the terms first, second, third, etc. may be used herein to describe various elements, these elements should not be limited by these terms. These terms are only used to distinguish one element from another.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by hardware and/or in software (including firmware, resident software, micro-code, etc.), referred to herein as "circuitry" or "circuit". For example, some of the functionality my be implemented in computer program instructions that may be provided to a processor of a general purpose computer, special purpose computer, digital signal processor and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a processor of the computer and/or other programmable data processing apparatus to function in a particular manner, such that the instructions stored in the computer-readable memory produce an article of manufacture including instructions which implement the function/act as specified in the block diagrams and/or flowchart block or blocks. The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

A computer-usable or computer-readable medium may be, for example but not limited to, an electronic, magnetic, optical, electromagnetic or semiconductor system, apparatus or device. More specific examples (a non-exhaustive list) of the computer-readable medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Although some of the diagrams include arrows on communication paths to show a primary direction of communication, it is to be understood that communication may occur in the opposite direction to the depicted arrows.

For purposes of illustration and explanation only, various embodiments of the present invention are described herein in the context of wireless mobile communication terminals ("communication terminals" or "terminals"). It will be understood, however, that the present invention is not limited to such embodiments and may be embodied generally in any electronic device that is configured to play alert tunes in response to receiving messages that are communication from another electronic device. For example, embodiments of the present invention may be embodied in user interfaces for gaming consoles, portable electronic game devices, and/or multimedia players that are configured to operate according to at least one embodiment herein.

In some embodiments of the present invention, a terminal is configured to receive messages that can include text, pictures, and/or video from other terminals. The terminal is configured to respond to receipt of each of the messages by examining content of the message according to at least one defined rule and to control sound characteristics of an alert tune that is played through a speaker responsive to the examined message content. The terminal may thereby play alert tunes that sound differently in response to recognizing different words and/or phrases contained in the message text. The recognized words and/or phrases may, for example, be identified as indicating that the message text is conveying a positive (e.g., happy) emotion and/or that it is conveying a negative (e.g., sad, angry, and the like) emotion.

An exemplary embodiment of a terminal 100 that is configured in accordance with some embodiments as shown in FIG. 1. Referring to FIG. 1, the terminal 100 may include a RF transceiver 120, a speaker 130, a microphone 132, a user input interface 134 (e.g., keypad, keyboard, touchscreen), a display 136, a controller 140, a library 150 that includes alert tunes that are associated with defined words and/or phrases, and another library 160 that includes image characteristics have been defined for certain people, animals, and/or other objects (e.g., automobiles, motorcycles, etc.). The controller 140 can be configured to control operation of the other elements of the terminal 100.

The RF transceiver 120 may include a cellular transceiver 122, a wireless local area network (WLAN) transceiver 124, and/or a Bluetooth transceiver 126. The cellular transceiver 122 may be configured to receive messages from another terminal 190 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The WLAN transceiver 124 may be configured to receive messages directly from the other terminal 190 and/or via a WLAN router 1 80. The Bluetooth transceiver 126 may be configured to receive messages directly from the other terminal 190. The messages may include, but are not limited to, a short messaging service (SMS), multimedia messaging service (MMS), instant messages, and/or e-mail types of messages.

The controller 140 may include a message text correlation module 142 and/or an image correlation module 146, and a message alert tune generation module 144. The text conelation module 142 attempts to match text from a received message to a list of words and/or phrases stored in the library 150. The alert tune generation module 144 controls sound characteristics of an alert tune that is played through the speaker 130 in response to the text correlation module 142 successfully matching text from the message to one or more words and/or phrases in the library 150. The library 150 can associate different words and/or phrases with different alert tunes, so that the alert tune generation module 144 can play different alert tunes through the speaker 130 in response to the text correlation module 142 matching message words and/or phrases to different entries in the library 150.

Moreover, the alert tune generation module 144 may assemble a song from a sequence of alert tune segments that are selected in response a sequence of message words and/or phrases that are matched to different entries in the library 150. The order by which the controller 140 plays the alert tune segments may correspond to (be responsive to) the order of occurrence of the matched words and/or phrases in the message text.

The alert tune generation module 144 may additionally or alternatively control sound characteristics of an alert tune that is played through the speaker 130 in response to the image correlation module 146 analyzing an image contained within picture data and/or video data content of a message text and successfully determining that the image contains an object that matches characteristics that have been previously defined in the library 160. The library 150 may include pictures or other data that defines visual characteristics of, for example, a person's face, animal features, and/or other object features (e.g., automobile, motorcycle, etc.) and can associate different alert tunes with the different defined characteristics. Accordingly, the alert tune generation module 144 can play different alert tunes through the speaker 130 in response to images containing objects that match different characteristics defined in the library 160.

For example, the alert and generation module 144 may play a first message alert tune when the image shows a person whose photograph has been previously stored by a user in the library 160, and may play a different second alert tune when the image does not show a person whose photograph has been previously stored in the library 160 and/or when it shows a different person than that which triggered the first message alert tune.

Although FIG. 1 illustrates an exemplary architecture that may be used for controlling sound characteristics of an alert tune in response to content of received messages, it will be understood that the present invention is not limited to such a configuration but is intended to encompass any configuration capable of carrying out the operations described herein.

Figure 2:
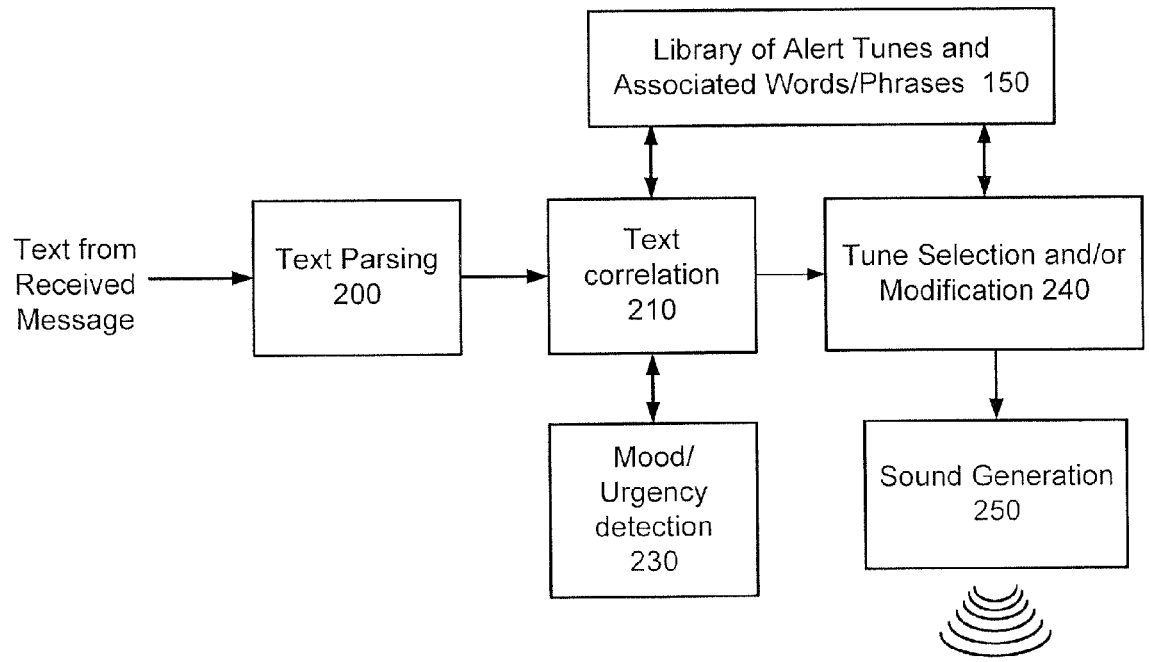
FIG. 2 is a block diagram that illustrates text correlation circuitry, a library of alert tunes and associated words and/or phrases in a memory, an alert tune selection and/or modification circuitry, and other circuitry configured in accordance with some embodiments of the present invention.

FIG. 2 is a block diagram that illustrates various exemplary circuitry that may be included in the controller 140 to correlate text in messages to words and/or phrases in the library 150 and, thereby, to the alert tunes associated with those words and/or phrases. Referring to FIG. 2, the controller 140 may include a text parsing unit 200 that separates text from received messages into individual words and/or phrases. The text correlation unit 210 attempts to match the words and/or phrases to one or more words and/or phrases stored in the library 150. A detection module 230 may analyze the words and/or phrases to determine whether they are known to indicate that a positive emotion and/or a negative emotion is being conveyed in the message text, such as by matching the words and/or phrases to known words and/or phrases that are associated with emotions. Another module 240 responds to the outcome of the matching by one or both of the modules 210 and 230 by selecting an alert tune that is associated with the matched words and/or phrases, and/or by modifying the sound characteristics of an alert tune (e.g., modifies the pitch and/or volume of the alert tune) in response to the outcome of the matching. A sound generation module 250 plays the selected and/or modified alert tune through the speaker 130. Accordingly, the circuitry of FIG. 2 may select and play different sounding alert tunes in response to text messages containing different known words and/or phrases.

Figure 4:
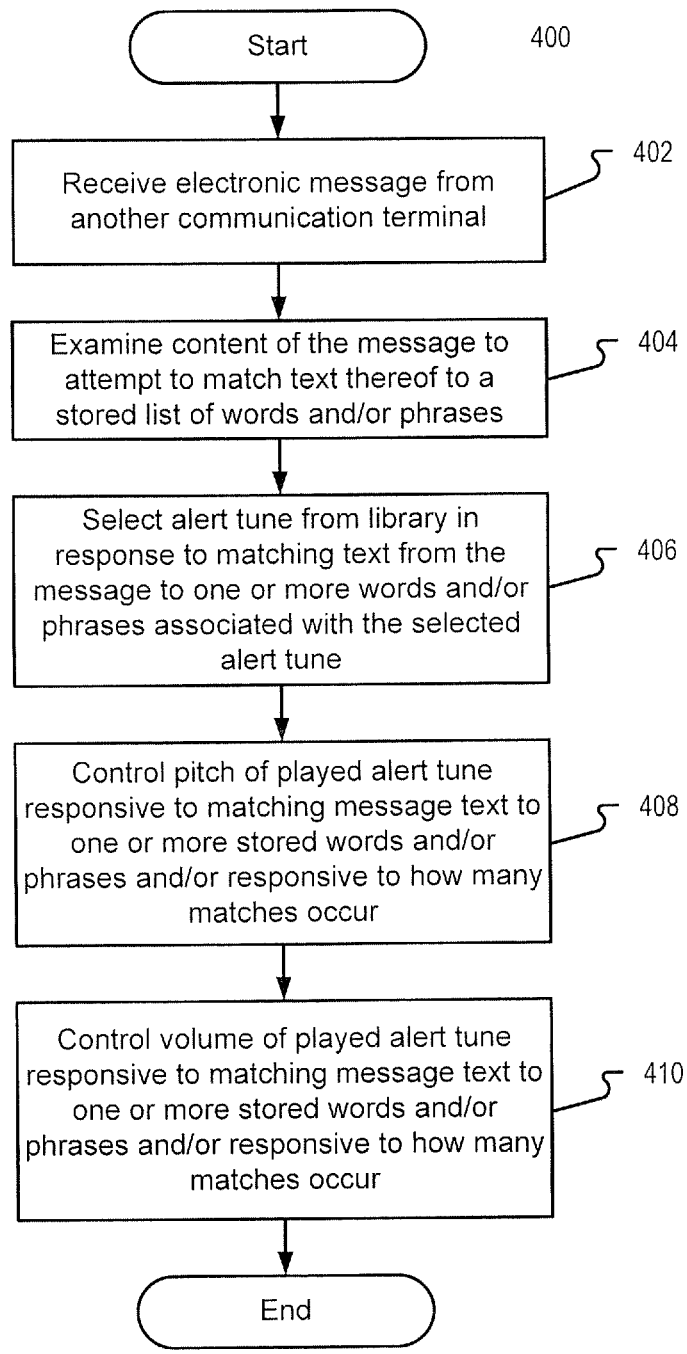
FIG. 4 is a flowchart that illustrates operations for controlling pitch and/or volume of an alert tune responsive to matching message text to words/phrases in the library in accordance with some embodiments of the present invention.

FIG. 4 is a flowchart that illustrates operations 400 and may be carried out by the controller 140 to control pitch and/or volume of an alert tune responsive to matching message text to words and/or phrases in the library 150. Referring to FIG. 4, an electronic message is received from another terminal (block 402), and the content of the message is examined to attempt to match its text to the list of words and/or phrases in the library 150 (block 404). In response to matching text from the message to one or more words and/or phrases in the library 150, the alert tune in the library 150 that is associated with the matched words/phrases is selected (block 406). The pitch and/or the volume of the alert tune is played through the speaker 130 is controlled in response to what words and/or phrases in the message text were matched to entries in the library 150 (blocks 408 and 410).

For example, the controller 140 may be configured to carry out at least one of increasing and decreasing pitch and/or the volume of the alert tune in response to matching the message text to one or more words and/or phrases stored in the library 150 that are known to indicate that a positive emotion (e.g., happy) is being conveyed in the message text, and to carry out theother one of increasing and decreasing the pitch and/or volume of the song in response to matching the message text to one or more words and/or phrases stored in the library 150 that are known to indicate that a negative (e.g., sad/angry) emotion is being conveyed in the message text. The pitch and/or the volume of the alert tune may additionally or alternatively be increased in response to matching the message text to one or more words and/or phrases in the library 150 that are known to indicate that an urgent situation is being conveyed in the message text.

The pitch and/or volume of the alert tune may be regulated in response to how many words and/or phrases of the message text are determined to match the words and/or phrases stored in the library 150. For example, the pitch and/or volume may be increased in response to an increased number (e.g., at least a threshold number) of matching words and/or phrases, and may be decreased in response to a decrease number (e.g., below a threshold number) of matching words and/or phrases.

Figure 3:
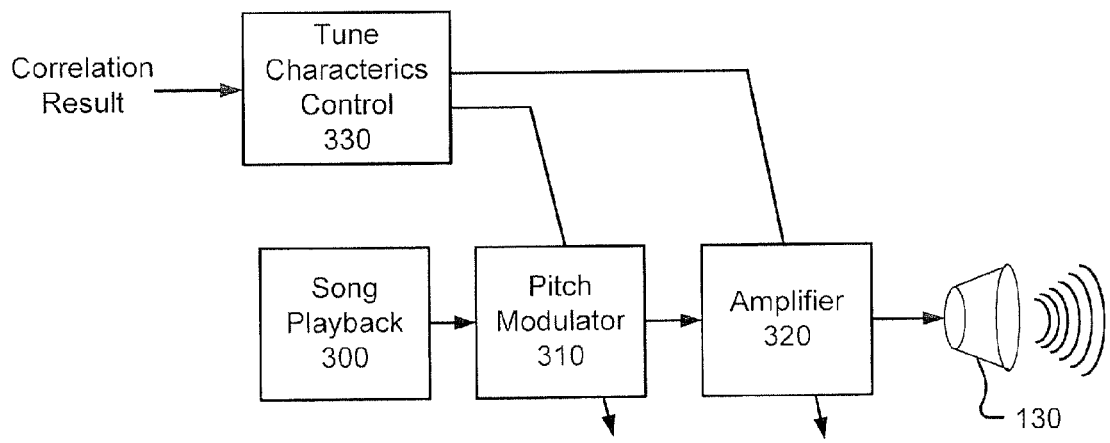
FIG. 3 is a block diagram of circuitry that controls sound characteristics of a song that is being played through the terminal in response to matching message text to words/phrases in the library in accordance with some embodiments of the present invention.

When a song is being played from the terminal 100 when a message arrives, the controller 100 can be configured to change sound characteristics of the song in response to matching text from the message to one or more words and/or phrases in the library 150 so as to generate an audible message alert through the song that is being played. FIG. 3 is a block diagram of exemplary circuitry that controls sound characteristics of a song that is being played through the terminal 100 in response to matching message text to words and/or phrases and the library 150. Referring to FIG. 3, a song playback module 300 may be configured to play encoded songs (e.g. MP3 encoded songs) from song data in a memory. A pitch modulator 310 is configured to control the pitch of the song, and an amplifier 320 is configured to control volume of the song that is played through the speaker 130. A tune characteristics control module 330 is configured to respond to a correlation result, which indicates if and/or how many words and/or phrases in a text message match entries in the library 150, by controlling the pitch effect provided by the pitch modulator 310 to the song and by controlling the amplification provided by the amplifier 320 to the song.

The controller 140 may be configured to play an alert tune in response to matching text from the received message to words and/or phrases stored in the library 150, and to not play the alert in response to the received message not containing text matching the entries stored in the library 150. Accordingly, a message may only trigger generation of an alert tune when the message contains text that matches words and/or phrases stored in the library 150.

Figure 5:
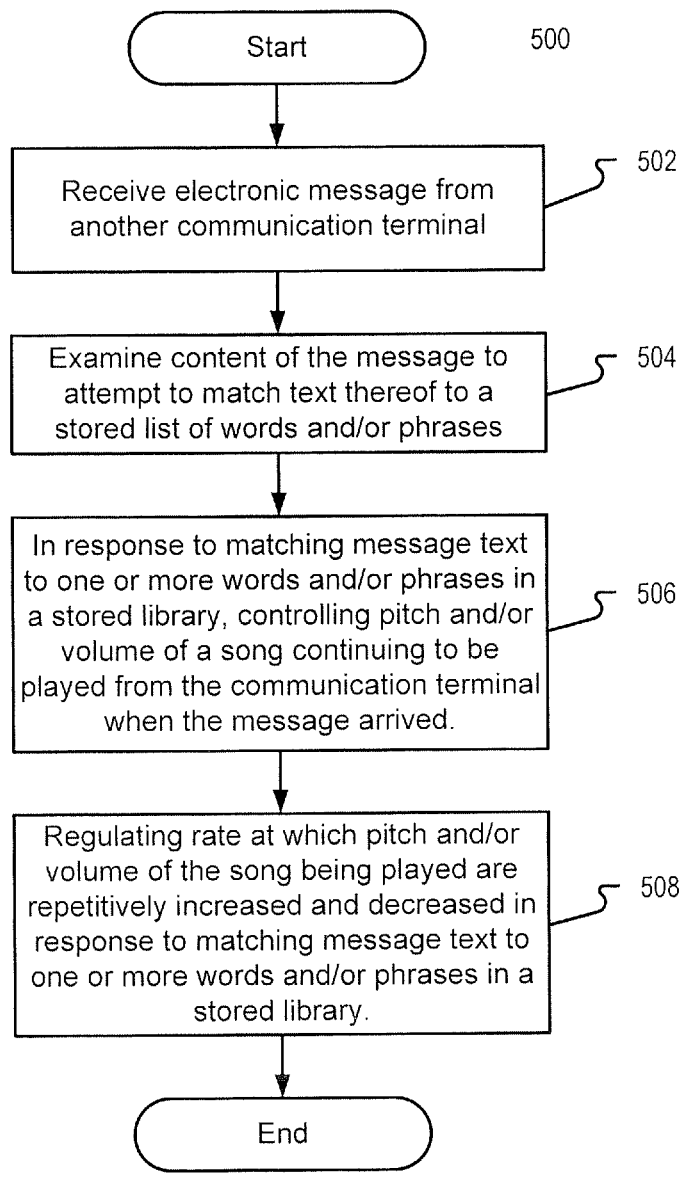
FIG. 5 is a flowchart that illustrates operations for controlling sound characteristics of a song being played from the terminal in response to matching message text to words/phrases in the library in accordance with some embodiments of the present invention.

FIG. 5 is a flowchart that illustrates operations 500 that may be carried out by the controller 140 to control sound characteristics of a song that is played through the speaker 130 in response to matching message text to words/phrases in the library 150. Referring to FIG. 5, an electronic message is received from another terminal (block 502), and the content of the message is examined to attempt to match its text to the list of words and/or phrases in the library 150 (block 504). In response to matching text from the message to one or more words and/or phrases in the library 150, the pitch and/or the volume of the song that is played through the speaker 130 is controlled in response to what words and/or phrases in the message text were matched to entries in the library 150 (block 506).

For example, the controller can be configured to carry out one of increasing and decreasing the pitch and/or volume of the song in response to matching the message text to one or more words and/or phrases stored in the library 150 that are known to indicate that a positive emotion (e.g., happy) is being conveyed in the message text, and the to to carry out the one of increasing and decreasing pitch and/or volume of the song in response to matching the message text to one or more words and/or phrases stored in the library 150 that are known to indicate that a negative (e.g., sad/angry) emotion is being conveyed in the message text. The pitch and/or volume of the song may additionally or alternatively be increased in response to matching the message text to one or more words and/or phrases in the library 150 that are known to indicate that an urgent situation is being conveyed in the message text.

The pitch and/or volume of the song may be regulated in response to how many words and/or phrases of the message text are determined to match the words and/or phrases stored in the library 150. For example, the pitch may be increased in response to an increased number (e.g., at least a threshold number) of matching words and/or phrases, and may be decreased in response to a decrease number (e.g., below a threshold number) of matching words and/or phrases.

The pitch and/or the volume of the song may be repetitively increased and decreased, such as to create an audible wobbling effect in the song that is being played to thereby generate an audible message alert while the song is being played. The rate at which the pitch and/or the volume of the song is repetitively increased and decreased may be regulated (block 508) in response to successfully matching the message text to one or more words and/or phrases stored in the library 150, and/or in response to how many words and/or phrases are matched to entries in the library 150. As described before, the words and/or phrases stored in a library 150 may be indicative of different emotions being conveyed through the message and/or may be indicative of an urgent situation being conveyed to the message.

Figure 6:
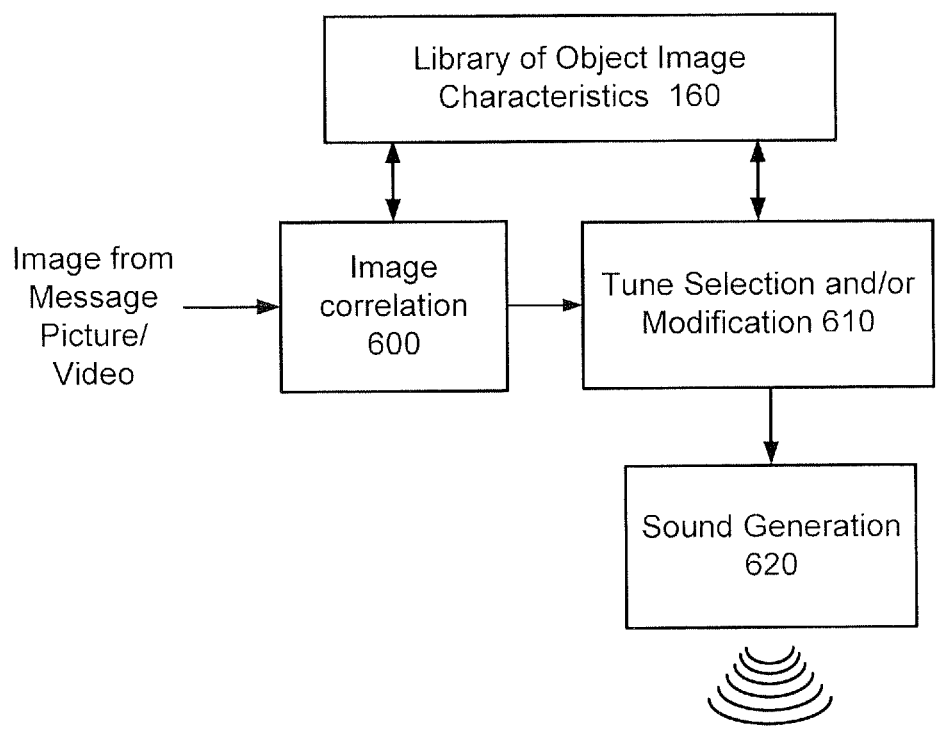
FIG. 6 is a block diagram of circuitry that controls sound characteristics of an alert tune in response to analysis of whether an image contained within picture data and/or video data content of the message matches characteristics of an object that has been previously defined in the terminal in accordance with some embodiments of the present invention.

FIG. 6 is a block diagram of circuitry that controls sound characteristics of an alert tune in response to analysis of whether an image contained within picture data and/or video data content of a message matches characteristics of an object that has been previously defined in the library 160. Referring to FIG. 6, and image correlation unit 600 attempts to match an object in an image contained within picture data and/or video data of a message based on characteristics that have been defined for various objects in the library 160. Another module 610 responds to the outcome of the con-elation by selecting an alert tune that is associated with the matched image characteristics, and/or by modifying the sound characteristics of an alert tune (e.g., modifies the pitch and/or volume of the alert tune) in response to the outcome of the correlation. A sound generation module 620 plays the selected and/or modified alert tune through the speaker 130. Accordingly, the circuitry of FIG. 6 may select and play different sounding alert tunes in response to identifying different images and pictures and/or video contained in a received message.

Figure 7:
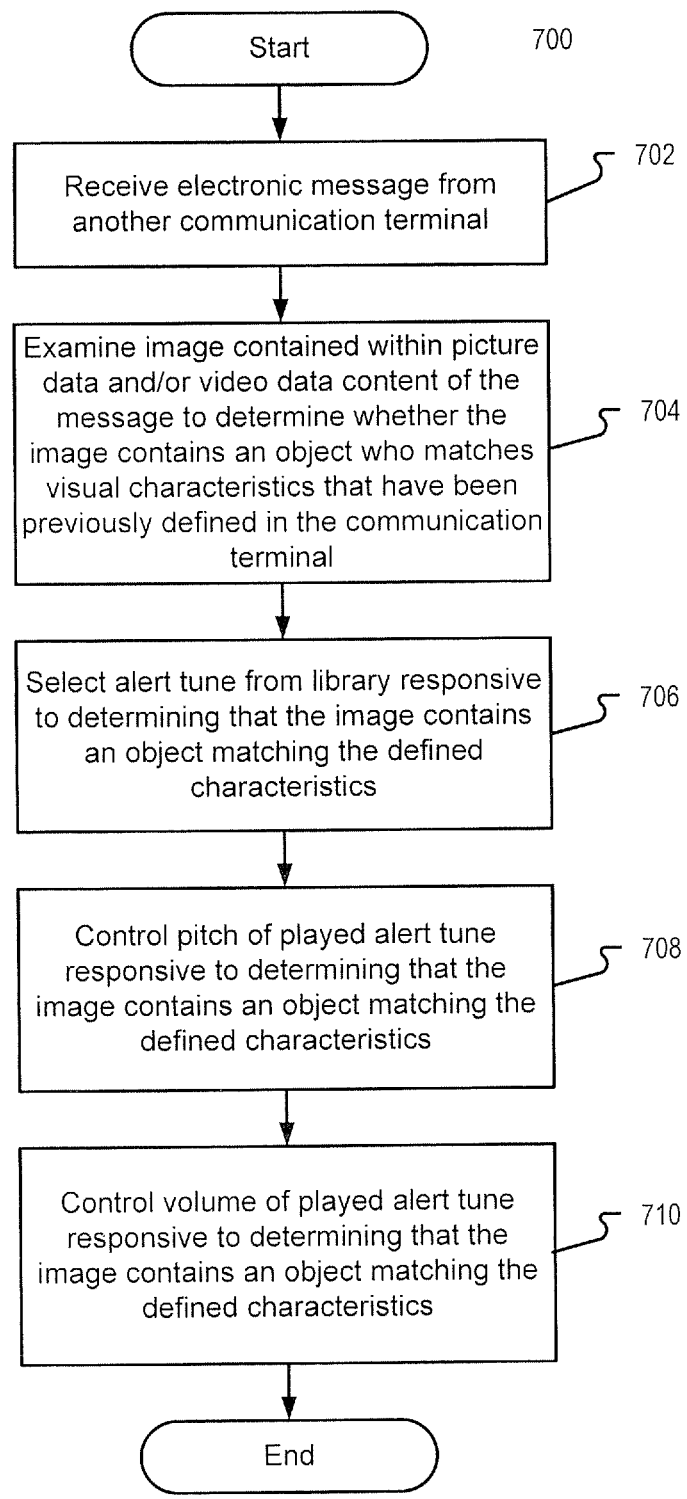
FIG. 7 is a flowchart of operations for controlling pitch and/or volume of an alert tune responsive to whether the image contains an object that matches characteristics that have been previously defined in the terminal in accordance with some embodiments of the present invention.

FIG. 7 is a flowchart of operations 700 that may be carried out by the controller 140 to control the pitch and/or volume of an alert tune responsive to whether the image contains an object that matches characteristics that have been previously defined in the operate 160. Referring to FIG. 7, an electronic message is received from another terminal (block 702), and an image contained in picture data and/or video data content of the message is examined to determine whether the image contains an object that matches characteristics that have been defined in the library 160 (block 704). In response to determining that the image contains an object matching identifying characteristics, an alert tune that corresponds to the matched image is selected from the library 160 (block 706). Alternatively or additionally, the pitch and/or the volume of the alert tune that is played through the speaker 130 is controlled in response to determining that the image contains an object matching the defined characteristics in the library 160 (blocks 708 and 710).

For example, an image contained in a message picture/video may be analyzed to determine whether it contains a person having characteristics that match one or more pictures that have been previously stored by a user in the library 160. Different alert tunes may be played through the speaker 130 depending upon which person is determined to be in the image, and/or the pitch and/or the volume of the alert tune may be increased or decreased depending upon which person is determined to be the image. In a similar manner, different sounding alert tunes may be played depending upon whether image contains a person versus an animal versus or an inanimate object such as a car or motorcycle.

The controller 140 may be configured to play an alert tune in response to matching an image object contained in a received message to characteristics stored in the library 160, and to not play the alert in response to the received message not containing an image object that matches characteristics stored in the library 160. Accordingly, a message may only trigger generation of an alert tune when the message contains an image object that matches characteristics stored in the library 160.

Many variations and modifications can be made to the preferred embodiments without substantially departing from the principles of the present invention. All such variations and modifications are intended to be included herein within the scope of the present invention, as set forth in the following claims.

That which is claimed:

1. A communication terminal comprising:
 a transceiver that is configured to receive electronic messages from another communication terminal; and
 a controller that is configured to respond to receipt of each of the messages by examining content of the message according to at least one defined rule and to control sound characteristics of an alert tune that is played through a speaker responsive to the examined message content,
 wherein the controller is further configured to analyze an image contained within picture data and/or video data of the message to determine whether the image contains an object that matches characteristics that have been previously defined in the communication terminal, the controller being further configured to control the sound characteristics of the alert tune responsive to an outcome of the image analysis.

2. The communication terminal of claim 1, wherein the controller is further configured to assemble a song from a sequence of alert tune segments that are selected in response to a sequence of message words and/or phrases that are matched to different entries in a stored list of words and/or phrases, and wherein the order in which the alert tune segments are played is responsive to the order of occurrence of the matched words and/or phrases in the message text.

3. The communication terminal of claim 2, wherein:
 the controller is further configured to regulate pitch of the played alert tune segments in response to matching text from the message to the different entries in the stored list of words and/or phrases.

4. The communication terminal of claim 3, wherein:
 the controller is further configured to carry out one of increasing and decreasing pitch of the played alert tune segments in response to matching text from the message to one or more of the stored words and/or phrases that are known to indicate that a positive emotion is being conveyed in the message text, and to carry out the other one of increasing and decreasing pitch of the played alert tune in response to matching text from the message to one or more of the stored words and/or phrases that are known to indicative that a negative emotion is being conveyed in the message text.

5. The communication terminal of claim 3, wherein:
 the controller is further configured to increase pitch of the played alert tune segments in response to matching text from the message to one or more of the stored words and/or phrases that are known to indicate that an urgent situation is being conveyed in the message text.

6. The communication terminal of claim 3, wherein:
the controller is further configured to regulate pitch of the played alert tune segments in response to how many words of the text from the message are determined to match the stored words and/or phrases.

7. The communication terminal of claim 2, wherein:
the controller is further configured to regulate volume of the played alert tune segments in response to matching text from the message to one or more of the stored words and/or phrases.

8. The communication terminal of claim 7, wherein:
the controller is further configured to increase volume of the played alert tune segments in response to matching text from the message to one or more of the stored words and/or phrases that are known to indicate that a positive emotion is being conveyed in the message text, and to decrease volume of the played alert tune segments in response to matching text from the message to one or more of the stored words and/or phrases that are known to indicate that a negative emotion is being conveyed in the message text.

9. The communication terminal of claim 7, wherein:
the controller is further configured to increase volume of the played alert tune segments in response to matching text from the message to one or more of the stored words and/or phrases that are known to indicate that an urgent situation is being conveyed in the message text.

10. The communication terminal of claim 7, wherein:
the controller is further configured to regulate volume of the played alert tune segments in response to how many words of the text from the message are determined to match the stored words and/or phrases.

11. The communication terminal of claim 1, wherein:
the controller is further configured to regulate pitch and/or volume of the played alert tune in response to the outcome of the image analysis.

12. A method of operating a communication terminal having a transceiver and a controller, the method comprising:
receiving by the transceiver an electronic message from another communication terminal;
analyzing by the controller an image contained within picture data and/or video data of the electronic message, to determine whether the image contains an object that matches characteristics that have been previously defined in the communication terminal; and
controlling by the controller sound characteristics of an alert tune responsive to an outcome of the image analysis.

13. The communication terminal of claim 2, wherein:
the controller is further configured to select among the sequence of alert tune segments that are stored in the communication terminal and have different sound characteristics in response to successfully matching text and/or phrases from the message to the different entries in the stored list of words and/or phrases.

* * * * *